3,031,306
PROCESS FOR FERMENTING YEAST DOUGHS AND PRODUCT THEREFOR

Rudolph J. Freed, Los Angeles, Calif., assignor to Bak-Kraft Corporation, Ltd., Los Angeles, Calif., a corporation of California
No Drawing. Filed Aug. 20, 1959, Ser. No. 834,952
1 Claim. (Cl. 99—90)

This invention relates generally to the preparation of yeast fermenting doughs for manufacture of all types of bread, rolls, coffee cakes, and the like, and more particularly to a novel process for substantially reducing the fermentation time for such doughs. This application is a continuation-in-part of my co-pending application Serial No. 613,613, filed October 3, 1956, and entitled Process for Fermenting Yeast Doughs, which has been abandoned.

In a conventional straight dough process, the dough mix is fermented for two to three and one-half hours during which time fermentation weight is lost and most of the sugar is consumed. A loaf of bread made by this process will remain fresh for one or two days.

In the conventional sponge and dough process, on the other hand, a longer total fermentation time of from four to six hours for the sponge and dough is required. This process has the advantage however of superior conversion of starches in the sponge together with preservation of the sugar, which is added only after fermentation of the sponge. Therefore, a larger, silkier, softer loaf of bread is provided with the result that this type of bread is the most desirable from the standpoint of the public and will retain its freshness for three or four days.

In both the foregoing straight dough and sponge and dough processes, it will be evident that a relatively long fermentation or floor time is required.

Considerable time and labor could be saved if it were possible to reduce the fermentation time. Towards this end, there are many processes of which I am aware that have been developed and patented for reducing the natural fermentation or conversion time of the starches within the flour of a dough mix in an attempt to provide a no time dough. These prior art processes were greatly advocated and practiced in the 1920's. Generally, these processes involved an increasing of the yeast content in the dough mix and an increasing of the fermentation temperature. Sometimes as much as 8 to 12% yeast and elevated temperatures of 90 degrees F. have been used to provide no time dough.

In such no time dough, the great amounts of yeast and high temperatures are not capable of converting or fermenting the starches within the flour properly, and will only produce a carbon-dioxide gas as a result of the action of the yeast on the sugar. As a consequence, these prior proposals have not been successful nor are they desirable and the bread resulting from the practice of these processes becomes exceeding hard and stale within 24 hours after baking, thus rendering it useless.

With the foregoing in mind, it is a primary object of my invention to provide a novel process and composition for the preparation of yeast doughs which requires only 30 to 45 minutes fermentation time instead of 4 to 6 hours as presently required by conventional sponge and dough processes, and yet produces bread of equal or even superior quality to present breads.

Another object is to provide a novel composition in the form of a dry, stable ingredient for addition to any yeast leavened dough which will by enzymic and catalytic action reduce fermentation time by as much as 90%.

Still another object of the invention is to provide a novel and improved dough fermenting process that enables flours to be used of lower protein content than heretofore ordinarily used.

Still another object is to reduce fermentation losses by carrying out the fermentation in a relatively short period of time.

In accordance with this invention, I have discovered a novel composition which when added to the conventional dough formula brings about a conversion and fermentation action which reduces fermentation time by from 60 to 90%. This composition embodies the enzymes, amylase and protease, derived from the mold *Aspergillus oryzae*, in combination with cultured lactic acid and active soya protein (urease) and a suitable filler. In my process, the entire formula is mixed in low for 2 minutes and in high for 10 to 14 minutes at a temperature of 84 degrees F. Only 30 to 45 minutes fermentation time is then required prior to feeding to a divider and suitable make-up machines for subsequent baking. The resulting product is of a quality equal to or even superior to bread made from straight dough or long sponge and dough processes.

A better understanding of this invention will be had by first referring to the following description of conventional dough processes.

Conventional straight dough is formed by scaling into a dough mixer approximately 184 ingredient parts in the following proportions:

| | | |
|---|---|---|
| Flour | parts | 100 |
| Water | do | 64 |
| Yeast | do | 2 to 3 |
| Yeast food | do | ½ |
| Enrichment wafer | wafers | 1 |
| Powdered skim milk | parts | 4 |
| Sugar | do | 6 |
| Shortening | do | 4 |
| Salt | do | 2 |

The foregoing ingredients are mixed in low for about 2 minutes and in high from 10 to 14 minutes, the temperature being maintained from 80 to 82 degrees F. The dough is then placed in a dough drawer for approximately 2 to 3½ hours to permit fermentation. The dough is then ready for the divider, rounder, and other make-up machines preparatory to subsequent baking.

In conventional sponge dough, a two step process is employed. First a sponge is formed by scaling into a dough mixer the following ingredients:

| | | |
|---|---|---|
| Flour | parts | 65 |
| Water | do | 39 |
| Yeast | do | 2 to 3 |
| Yeast food | do | ½ |
| Enrichment wafer | wafers | 1 |

These ingredients are mixed in high for 3 to 4 minutes at a temperature of from 76 to 78 degrees F. The sponge is then fermented for approximately 4 to 5 hours and then returned to the mixer and the following ingredients are added:

| | Parts |
|---|---|
| Flour | 35 |
| Water | 25 |
| Powdered skim milk | 4 |
| Sugar | 6 |
| Shortening | 4 |
| Salts | 2 |

The foregoing is mixed with the original sponge in low for 2 minutes and in high from 10 to 14 minutes at a temperature of from 80 to 82 degrees F. The mixture is then given a floor time or additional fermentation time of from 15 to 45 minutes prior to feeding to the divider, rounder, and other make-up machines for subsequent baking.

In both of the foregoing conventional processes, a considerable length of time for fermentation is required.

In accordance with the present invention, my newly discovered additional composition is added to the straight dough formula in an amount equal by weight to 1% of the flour in the dough formula. In the next step, the additional composition is mixed thoroughly with the other dough ingredients in low for 2 minutes and in high for from 10 to 14 minutes at a dough temperature of 84 degrees F. The resulting dough is then fermented for from 30 to 45 minutes depending upon the strength of the protein in the flour.

The additional composition itself, in accordance with the invention, is made up in the following proportions assuming the entire additional composition to constitute 100 parts:

| | Parts |
|---|---|
| Filler | 85.75 |
| The enzymes, amylase and protease | 2.85 |
| Cultured lactic acid | 2.70 |
| Active soya protein | 8.70 |

The filler may be wheat flour or starch or combinations thereof.

The enzymes, amylase and protease, are derived from the mold *Aspergillus oryzae* and blended to contain a balance of amylase and protease units of activity on the Sandstedt, Kneen and Blish (S.K.B.) scale of 5,000 S.K.B. amylase units per gram and 5,000 hemoglobin protease units per gram. From the proportions given in the above table, it will be evident that the total enzymes constitute 2.85 parts per 100 parts which is equivalent to approximately 13.4 grams of enzymes per pound of the entire additional composition.

The proportional amount of the filler may vary, the 85.75 parts being given merely as exemplary. The proportions for the enzymes, amylase and protease should not vary materially, although in substantial variations will not affect the present process. The enzymes and protein together constitute the active ingredients, and a decrease in the proportional amount thereof will lengthen the fermentation time.

The foregoing described additional composition and its indicated modifications is in the form of a powder and is added to the basic straight dough mix as 1% of the weight of the flour of the mix as described. Thus the new formula will comprise about 185 parts of which 100 parts are flour and one part is the additional composition.

In the foregoing process, the enzymic catalytic action of the additional composition has demonstrated a saving of fermentation time and thus floor time of as much as 90% over the conventional straight dough and long sponge and dough processes. Moreover, less fermentation loss occurs and less sugar is consumed providing the advantages of the sponge and dough process without the necessity of long fermentation time. As a consequence, bread cannot only be manufactured in considerably less time and with considerably less labor than required heretofore, but in addition the resulting bread itself is of a quality as to texture, rise, taste, and retention of freshness equal to or even superior to that of bread produced by the straight dough or long sponge and dough processes.

What is claimed is:

In a fermentation process for preparing a yeast dough mix which includes 184 ingredient parts of which 100 parts are flour, 2 to 3 parts are yeast, ½ part yeast food and the remaining parts include water, skim milk, sugar, shortening and salt, the steps of preparing an additional composition wherein 85.75 parts comprise a filler selected from the group consisting of wheat flour and starch, an enzyme consisting of amylase and protease which are derived from mold *Aspergillus oryzae* in the amount of 2.85 parts, said enzyme being blended to contain a balance of 5,000 S.K.B. amylase units per gram, lactic acid 2.70 parts and active soya protein 8.70 parts, mixing said ingredients, adding the additional composition to the ingredients of said yeast dough mix in an amount by weight equal to 1% of the weight of the flour in said yeast dough, mixing said combination of ingredients in low for 2 minutes and in high for from 10 to 14 minutes at a dough temperature of 84 degrees F.; and then fermenting said mixed dough for from 30 to 45 minutes depending upon the strength of the protein in said flour.

References Cited in the file of this patent

UNITED STATES PATENTS

| 1,500,545 | Buffington | July 8, 1924 |
| 1,677,529 | Pollak | July 17, 1928 |
| 1,722,677 | Patterson et al. | July 30, 1929 |
| 2,842,442 | Jeffreys | July 8, 1958 |

FOREIGN PATENTS

| 567,376 | Great Britain | Feb. 12, 1945 |

OTHER REFERENCES

"Bakers Digest," February 1948, pages 28 and 29.
"Federal Register," August 8, 1950, pages 5102, 5104, 5107 and 5108.
"Bakers Digest," June 1952, pages 21 and 22.
"Baking Science and Technology," vol. II, 1952, by Pyler, published by Subel Publishing Co. (Chicago), pages 427 and 428.